United States Patent [19]
Andersen et al.

[11] 3,906,441
[45] Sept. 16, 1975

[54] VEHICLE SAFETY BELT WARNING CIRCUIT

[75] Inventors: Poul H. Andersen, Royal Oak; Robert E. Klacza, Taylor, both of Mich.

[73] Assignee: Chrysler Corporation, Highland Park, Mich.

[22] Filed: Sept. 16, 1974

[21] Appl. No.: 506,150

[52] U.S. Cl. ............ 340/52 E; 340/278; 307/10 SB
[51] Int. Cl.² ........................................ B60R 21/10
[58] Field of Search ....... 340/52 E, 278; 307/10 SB; 180/82 C; 200/61.58 B

[56] References Cited
UNITED STATES PATENTS
3,757,293   9/1973   Petersen ............................ 340/52 E

*Primary Examiner*—Alvin H. Waring
*Attorney, Agent, or Firm*—Talburtt & Baldwin

[57] ABSTRACT

A circuit operatively associated with selected occupant seat positions in a vehicle for providing a warning whenever any one of the selected seat positions is occupied and the associated safety belt is not in use. The emitter-collector circuit of a main control transistor operatively couples a warning device such as a lamp and/or buzzer, with the vehicle battery, and the base circuit of the transistor is operatively coupled with each selected seat position by means of an associated input circuit. One input circuit is operatively associated with the driver seat position and includes a normally open safety belt switch which closes when usage of the driver safety belt is indicated to have occurred. Another input circuit is operatively associated with a passenger seat position and includes both a normally open seat switch which closes upon occupancy of the seat position and a normally open safety belt switch which closes when usage of the passenger safety belt is indicated to have occurred. When the vehicle ignition switch is operated by the driver to the run position, the main control transistor will be rendered conductive to energize the warning device unless the driver safety belt is indicated to be in use; and if the passenger seat position is also occupied, the warning device will be similarly actuated unless the passenger safety belt is indicated to be in use. The vehicle starting circuit, which includes a transmission switch, is operatively coupled with the input circuits to the transistor to prevent the main control transistor from being rendered conductive when the vehicle engine is being started. The safety belt switches and seat switch are electrically isolated from the starting circuit so that they do not influence operation of the starting circuit.

4 Claims, 2 Drawing Figures

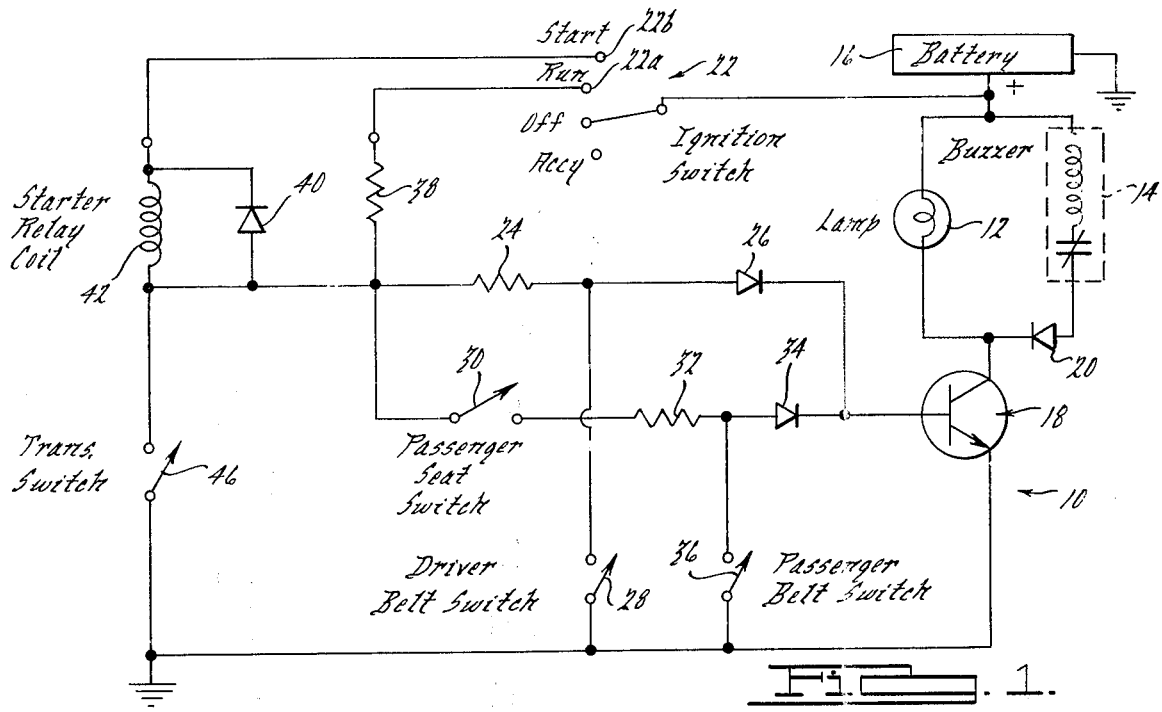

VEHICLE SAFETY BELT WARNING CIRCUIT

BACKGROUND AND SUMMARY OF THE INVENTION

The present invention pertains to vehicle safety belt warning circuits and in particular to a novel warning circuit of the non-sequential type which utilizes normally open seat switches and normally open safety belt switches.

Automotive vehicles presently manufactured for sale in the United States include ignition interlock and safety belt warning systems which prevent the vehicle from being started if the occupants of selected seat positions in the vehicle have failed to fasten their safety belts after being seated. Because vehicle starting is permitted only if the occupants of the selected seat positions have first seated themselves before fastening their safety belts, this is commonly known as a sequential type system. These systems also give a warning signal if anyone of the occupants of the selected seat positions unfastens his safety belt after the vehicle has been placed in gear. The safety belt warning and ignition interlock system provided on 1974 Chrysler Corporation vehicles destined for sale in the United States accomplishes the above objectives by means of a novel electronic circuit of the sequential type which utilizes normally open seat switches and normally open safety belt switches. An example of this novel circuit is disclosed in the application of Poul H. Andersen, Ser. No. 276,634, filed July 31, 1972, now U.S. Pat. No. 3,860,904, and assigned to the same assignee as the present application.

While Federal regulations mandate that current production automotive vehicles destined for sale in the United States contain a sequential type ignition interlock and safety belt warning system, as described above, such requirements are not necessarily imposed on vehicles destined for foreign markets. For example, present Canadian regulations require only that a warning be given when the safety belts in selected occupied seat positions are not fastened, and do not require an ignition interlock or sequential operation.

The present invention is directed toward a novel safety belt warning circuit of the non-sequential type which gives a warning signal whenever the safety belts at selected occupied seat positions are not fastened. Importantly, the safety circuit utilizes normally open safety belt switches and normally open seat switches for its operation and, hence, is compatible with the switches provided in the 1974 Chrysler system as described above. More specifically, the present invention can convert a U.S. type system into a Canadian type system by simply replacing one electronic circuit module with another. As will be appreciated, this aspect of the present invention is especially advantageous in assembly plants which assemble vehicles destined for both United States and Canadian markets since common switches and wiring harnesses may be used for both types of vehicles. A further attribute of the present invention is that a relatively small number of electronic circuit components are used; hence, the invention realizes a significant economy from both assembly and material standpoints.

The foregoing features and advantages of the invention, as well as additional ones, will be seen in the ensuing description and claims which are to be taken in conjunction with the accompanying drawings. The drawings illustrate preferred embodiments of the invention in accordance with the best mode presently contemplated for carrying out the invention.

BRIEF DESCRIPTION OF THE DRAWINGS

FIG. 1 is an electrical schematic diagram of one embodiment of safety belt warning circuit according to the present invention.

FIG. 2 is an electrical schematic diagram of another embodiment of circuit according to the present invention.

DESCRIPTION OF THE PREFERRED EMBODIMENTS

In FIG. 1 a safety belt warning circuit 10 embodying principles of the present invention is shown in operative association with certain existing components on a vehicle. Circuit 10 comprises a warning lamp 12 and a warning buzzer 14 which are connected in parallel with each other and across the vehicle battery 16 by means of the emitter-collector terminals of an NPN type main control transistor 18. If desired, a diode 20 may be connected in series with buzzer 14 as shown, to permit both lamp 12 and buzzer 14 to be energized by transistor 18 while preventing lamp 12 from being energized when buzzer 14 is actuated from another circuit (not shown). Circuit 10 further includes a pair of input circuits connected to the base of transistor 18 from the existing vehicle ignition switch 22. One of these circuits is operatively associated with the driver seat position of the vehicle while the other is operatively associated with a passenger seat position of the vehicle. The input circuit associated with the driver seat position comprises a resistor 24, a diode 26, and a driver safety belt switch 28, and the input circuit operatively associated with the passenger seat position comprises a passenger seat switch 30, a resistor 32, a diode 34 and a passenger safety belt switch 36. Both input circuits are operatively connected through a resistor 38 to the run terminal 22a of ignition switch 22. Passenger seat switch 30 is of the normally open type; that is, the switch is open when the passenger seat is unoccupied and closed when the seat is occupied. Also, driver safety belt switch 28 and passenger safety belt switch 36 are of the normally open type so that when either the driver safety belt or the passenger safety belt is not in use, the corresponding safety belt switch is open and when the belt is in use, the switch is closed. For purposes of the present invention, any conventional arrangement for mounting the safety belt switch may be employed. It will be observed that in the driver seat input circuit, resistor 24 and diode 26 are connected from resistor 38 directly to the base of transistor 18 while in the passenger seat input circuit, passenger seat switch 30, resistor 32 and diode 34 are connected from resistor 38 to the base of transistor 18. Driver safety belt switch 28 is connected directly from the junction of resistor 24 and diode 26 to ground while passenger safety belt switch 36 is connected directly from the junction of resistor 32 and diode 34 to ground.

Circuit 10 is also operatively coupled with the existing engine starting circuit of the vehicle in the following manner. In the existing starting circuit, the coil 42 of the starter relay (preferably shunted by a suppression diode 40) is connected between the start contact 22b of ignition switch 22 and the transmission switch 46.

The transmission switch is operatively associated with the vehicle transmission, and where a conventional automatic transmission is used, transmission switch 46 is open when the transmission is in any forward or reverse drive (i.e., in gear) and closed when the transmission is in either park or neutral. Hence, starter relay coil 42 can be energized to effect vehicle starting only when the vehicle transmission is in park or neutral and ignition switch 22 is operated to connect its start contact 22b with battery 16. Circuit 10 is connected with transmission switch 46 by means of a connection from the load side of resistor 38 to the junction of starter relay coil 42 and transmission switch 46.

The operation of the circuit is as follows. Transistor 18 operates in conducting and non-conducting states to correspondingly connect and disconnect lamp 12 and buzzer 14 from battery 16. With transistor 18 non-conducting, lamp 12 and buzzer 14 cannot be energized from battery 16 and hence provide no warning. However, when transistor 18 is conducting, both lamp 12 and buzzer 14 are effectively connected across battery 16 to be energized and thereby give both a visual and an audible warning alarm to occupants of the vehicle. The state of operation of transistor 18 depends upon the condition of the input circuits. If it is assumed that the driver of the vehicle enters and seats himself in the vehicle and starts the engine (the transmission being in either start or neutral) then current flows from terminal 22b of ignition switch 22 through resistor 38 and through transmission switch 46 to ground, bypassing the inputs circuits to transistor 18. If it is assumed that the driver has not fastened his safety belt when he places the transmission in gear, the opening of transmission switch 46 prevents it from shunting current away from the input circuit to transistor 18 and, therefore, current flows through resistor 38, resistor 24 and diode 26 to the base of transistor 18. The values of resistor 38 and resistor 24 are such that transistor 18 is switched into conduction thereby permitting current flow from battery 16 to light lamp 12 and sound buzzer 14. Should the driver now fasten his safety belt, switch 28 closes, and the closing thereof operates to shunt current to ground away from diode 26 and, hence, away from the base of transistor 18, thereby rendering transistor 18 non-conducting and preventing further energization of lamp 12 and buzzer 14. It will be noted that the driver seat circuit cannot cause an alarm warning to be given if switch 28 is closed; accordingly, the operation of the circuit is non-sequential. It will further be observed that no driver seat switch has been provided since it is presumed that a driver will be present if the transmission is placed in gear and the ignition switch 22 is in run.

The operation of the passenger circuit is somewhat similar to that of the driver circuit; yet the operation of one is completely independent of the other. The passenger seat circuit is also connected with transmission switch 46 in the same manner as is the driver seat circuit. Therefore, the passenger seat circuit can give an alarm only when ignition switch run terminal 22b is connected to battery 16 and the transmission is in gear. Assuming that no passenger is present in the vehicle, then passenger seat switch 30 remains open at all times and prevents any base current from flowing through the passenger circuit to render transistor 18 conducting. However, when the passenger seat is occupied, passenger seat switch 30 closes to complete a circuit from resistor 38 through switch 30, resistor 32 and diode 34 to the base of transistor 18. Transistor 18 will, therefore, be switched into conduction to energize lamp 12 and buzzer 14 from battery 16 so long as the passenger safety belt switch 36 remains open. When the passenger finally fastens his safety belt, switch 36 closes to shunt current away from diode 34 and the base of transistor 18 thereby preventing the passenger seat circuit from giving the warning signal. Because the passenger seat circuit cannot cause an alarm warning to be given if switch 36 is closed, its operation is non-sequential. It will be noted that diodes 26 and 34 serve to isolate the two seat circuits from each other at the base of transistor 18 so that each seat circuit is capable of switching transistor 18 into conduction independently of the other. Moreover, the provision of resistors 24 and 32 isolates the safety belt switches 28 and 36 from transmission switch 46 so that the safety belt switches do not influence operation of the starter circuit.

In FIG. 2, a further embodiment of safety belt warning circuit 50 embodying principles of the present invention is shown in operative association with certain existing components on a vehicle. In many respects, circuit 50 is like circuit 10 of FIG. 1, and similar elements in both Figures are identified by like numerals. In circuit 50 a number of electronic circuit components are contained in a circuit module 52 which includes twelve terminal pins 52a through 52l which render the module compatible with the switches and wiring harnesses provided in 1974 Chrysler Corporation vehicles. In addition to being suited for use with normally open seat switches and normally open safety belt switches, circuit 50 is compatible with grounding type seat switches as well as grounding type safety belt switches, which type of switch is especially desirable in many automotive applications such as the present one.

The connection of terminal pins 52a through 52l is as follows. Terminal pin 52a provides a connection to transmission switch 46; terminal pin 52b, a connection to run terminal 22a of ignition switch 22; terminal pin 52c a connection to the ground side of lamp 12; terminal pin 52d, a connection to the ground side of buzzer 14; terminal pin 52e, a connection to the battery side of starter relay coil 42; terminal pin 52f, a connection to start terminal 22b of ignition switch 22; terminal pin 52g, a connection to driver safety belt switch 28; terminal pin 52h, a connection to the right hand (R.H.) passenger seat switch 30; terminal pin 52i, a connection to the right hand passenger safety belt switch 36; terminal pin 52j, a connection to the center passenger seat switch 30a; terminal pin 52k, a connection to the center passenger safety belt switch 36a; and terminal pin 52l, a connection to ground.

In addition to the circuit components, which were included in the description of circuit 10, circuit 50 further includes a jumper 54 in module 52 connected between terminal pins 52e and 52f to provide a direct connection from start terminal 22b of ignition switch 22 to starter relay coil 42. The driver seat input circuit to the base of transistor 18 (comprising resistor 24, diode 26 and switch 28) is the same as in circuit 10. Module 52 contains a PNP transistor 56 and two resistors 58 and 60, which in conjunction with resistor 32, diode 34, and switches 30 and 36, constitutes the right hand passenger seat input circuit to transistor 18. The emitter-collector circuit of transistor 56 is connected in series with resistor 32 and diode 34 and resistors 58 and 60 are connected in series from the emitter of transistor 56 to seat switch 30 with the junction of the two resistors connecting to the base of transistor 56. The center passenger seat input circuit is identical to the right hand passenger seat input circuit, and components thereof corresponding to those of the right hand passenger seat input circuit are identified by the same base numeral followed by the letter "a" as a suffix.

The operation of the passenger seat input circuits will be described for the right hand passenger seat (with the ignition switch in run position) and it will be understood that the operation of the center passenger seat circuit is identical. So long as the right hand passenger seat is unoccupied, seat switch 30 remains open. This prevents transistor 56 from being switched into conduction since base current flow is prohibited. When the right hand passenger seat is occupied, switch 30 closes to permit base current flow, resistor 58 and resistor 60 being selected to create a magnitude of base current flow which is sufficient to switch transistor 56 from non-conduction into conduction. Now, current flows from resistor 38 through the emitter-collector circuit of transistor 56 through resistor 32 and diode 34 to the base of transistor 18. Transistor 18 is, therefore, switched into conduction to energize lamp 12 and buzzer 14. If the right hand passenger seat belt is now fastened, switch 36 closes to shunt the current passing through transistor 56 and resistor 32 away from diode 34 and, hence, away from the base of transistor 18. The result is that transistor 18 is switched back into non-conduction and lamp 12 and buzzer 14 are no longer energized via the right hand passenger seat circuit. Thus a warning is given only when the safety belt associated with an occupied seat is indicated not to be in use. It will be observed that diodes 26, 34 and 34a serve to isolate the three seat circuits from each other at the base of transistor 18 and, hence, each of the respective seat circuits is capable of rendering transistor 18 conducting independently of the others. Moreover, the provision of resistors 24, 32 and 32a isolates the respective safety belt switches from transmission switch 46 so that the safety belt switches do not influence operation of the starter circuit. Preferably, a resistor 60 is connected between the base and emitter of transistor 18 to minimize leakage current at elevated temperatures which might cause spurious conduction of transistor 18.

If desired, the circuit may be interlocked with the existing back-up circuit of the vehicle to prevent transistor 18 from conducting when the vehicle transmission is in reverse gear. One way of doing this is by using a resistor and an NPN type transistor. The emitter of this transistor would be connected to the emitter of transistor 18 and the collector of the NPN transistor to the base of transistor 18. The base of the NPN transistor is connected through the new resistor to the back-up lamp circuit. When the back-up lamp circuit is connected to the battery, by closing of the back-up lamp switch when the transmission is placed in reverse gear, the NPN transistor is switched into conduction to shunt, via its emitter-collector current away from the base of transistor 18 thereby preventing transistor 18 from switching into conduction so long as the transmission remains in reverse gear.

What is claimed is:

1. In a vehicle having a plurality of seat positions each equipped with a safety belt for use by an occupant thereof and wherein the vehicle includes an engine operatively coupled with wheels via a transmission which is selectively operable to drivingly engage and disengage the wheels with the engine and is provided with a transmission switch which is open when the transmission is operated to drivingly engage the engine with the wheels and is closed when the transmission is operated to drivingly disengage the engine with the wheels and an engine start and run circuit including an ignition switch which is selectively operable to start and run positions for selectively coupling a battery via a start contact of said ignition switch to a start circuit including said transmission switch for starting the engine when the wheels are drivingly disengaged therefrom by the transmission and coupling the battery via a run contact of said ignition switch to a run circuit for running the engine, a safety belt warning system for providing a warning signal indicative of non-use of a safety belt by an occupant of any of said plurality of seat positions, said system comprising:

an alarm means energizable from the battery to provide said warning signal;

a transistor having its emitter-collector circuit coupling said alarm means in circuit with the battery so that when base current flows in the transistor the emitter-collector circuit thereof conducts current from the battery to energize said alarm means;

a plurality of input circuits each operatively coupling a corresponding one of said seat positions to the base of said transistor for controlling base current flow in said transistor;

one of said input circuits comprising a seat switch which is open when the corresponding seat position is unoccupied and closed when the corresponding seat position is occupied, a safety belt switch which is open when the corresponding safety belt is not in use and closed when the corresponding safety belt is indicated to be in use, a diode, means connecting said diode and said seat switch in series from said ignition switch run contact to the base of said transistor such that with the ignition switch in the run position, current is conducted from the battery through said seat switch and said diode to said transistor to create base current flow therein for causing said alarm means to be energized, and means connecting said safety belt switch in said one input circuit such that when said safety belt switch is closed current flowing into said transistor through said seat switch and said diode is shunted through said safety belt switch from said diode and said transistor to terminate base current flow in said transistor and thereby de-energize said alarm means;

another of said input circuits comprising a safety belt switch which is open when the corresponding safety belt is not in use and closed when the corresponding safety belt is indicated to be in use, a diode, means connecting said last-mentioned diode in series from said ignition switch run contact to the base of said transistor such that with the ignition switch in the run position current is conducted from the battery through said last-mentioned diode to said transistor to create base current flow therein for causing said alarm means to be energized, and means connecting said last-mentioned safety belt switch in said another input circuit such that when said last-mentioned safety belt switch is closed current flowing into said transistor through said last-mentioned diode is shunted therefrom by by said last-mentioned safety belt switch to terminate base current flow in said transistor and thereby de-energize said alarm means; and means connecting the start circuit with the ignition switch and said input circuits such that when the transmission switch is closed and the ignition switch is in the run position current flowing through said run contact of said ignition switch is shunted from said input circuits through the transmission switch to prevent base current flow in said transistor and, hence, prevent energization of said alarm means, and such that when the transmission switch is open and the ignition switch is operated to the start position, said input circuits are prevented from energizing the starting circuit.

2. Safety belt warning system as claimed in claim 1 wherein said another input circuit additionally includes an additional seat switch which is open when the corresponding seat position is occupied, said additional seat switch being operatively connected in said means connecting said last-mentioned diode in series from said ignition switch run contact to the base of said transistor.

3. Safety belt warning system as claimed in claim 1 wherein resistance means is provided for preventing said input circuits from energizing the starting circuit.

4. Safety belt warning system as claimed in claim 1 wherein said safety belt switch is directly connected to one terminal of said first-mentioned diode.

* * * * *